United States Patent [19]
Wise et al.

[11] 4,005,829
[45] Feb. 1, 1977

[54] TAPE ROLL AND CORE

[75] Inventors: Walter R. Wise, Pittsford; Ellsworth J. Allen, Newark; Donald K. Fisher, Palmyra, all of N.Y.

[73] Assignee: Garlock Inc., Palmyra, N.Y.

[22] Filed: May 21, 1975

[21] Appl. No.: 579,473

Related U.S. Application Data

[62] Division of Ser. No. 402,482, Oct. 1, 1973, abandoned.

[52] U.S. Cl. .............................. 242/68.5; 242/7.23; 242/67.3 R
[51] Int. Cl.² ................... B65H 17/02; B65H 81/00
[58] Field of Search ............... 242/7.23, 46.2, 46.3, 242/67.2, 67.3 R, 68.3, 68.5

[56] References Cited
UNITED STATES PATENTS

| | | | |
|---|---|---|---|
| 566,049 | 8/1896 | Wolford | 242/67.3 R |
| 1,419,826 | 6/1922 | Como | 242/67.3 R |
| 1,674,278 | 6/1928 | Derry | 242/7.23 |
| 2,059,879 | 11/1936 | Pierre | 242/67.2 |
| 3,009,665 | 11/1961 | Umrath | 242/67.3 R |

Primary Examiner—Edward J. McCarthy
Attorney, Agent, or Firm—Schovee & Boston

[57] ABSTRACT

A portable hand tool for applying wrapping tape to pipe threads. The tape on a geared core is placed in a casing of the tool, the tool is clamped onto a fitting, a metering lever is advanced to feed tape into contact with the fitting, the tool is then rotated around the fitting, the tape is cut, and the tool unclamped and removed from the fitting.

21 Claims, 7 Drawing Figures

TAPE ROLL AND CORE

This is a division of application Ser. No. 402,482, filed Oct. 1, 1973, abandoned.

BACKGROUND OF THE INVENTION

1. Field of the Invention

This invention relates to the hand wrapping of threaded fittings and in particular to a hand tool therefor.

2. Description of the Prior Art

Prior to the present invention of a portable hand tool, hand wraps were made without the use of a tool and the inadequate contact between the tape and the threads resulted in poor bonding, causing slipping and unraveling of the tape. Further, hand wrapping is subject to waste, through dirt, tearing and general handling.

It is an object of the present invention to provide a hand tool wrap giving a uniform, high-quality wrap for sealing male pipe threads in the shop and on the job site. The hand tool wrap utilizes full contact area of the threads, rather than just the crests as in previous hand wrapping, to achieve a far superior bond with excellent shelf life.

It is another object of the invention to provide a hand tool that will accommodate a variety of different standard sizes with no changing of parts.

SUMMARY OF THE INVENTION

A portable hand tool method, apparatus and article, for wrapping male pipe threads comprising a casing for holding a tape roll, a plurality of support rollers including a splined threaded start roller, means for clamping the fitting against the support rollers, means for advancing tape into the joint between the fitting and the start roller whereby when the tool is rotated around the fitting the tape is wrapped onto the pipe threads, means for cutting the tape, and means for unclamping the tool from the fitting.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DETAILED DESCRIPTION OF THE PREFERRED EMBODIMENTS

Figures 1, 1A:
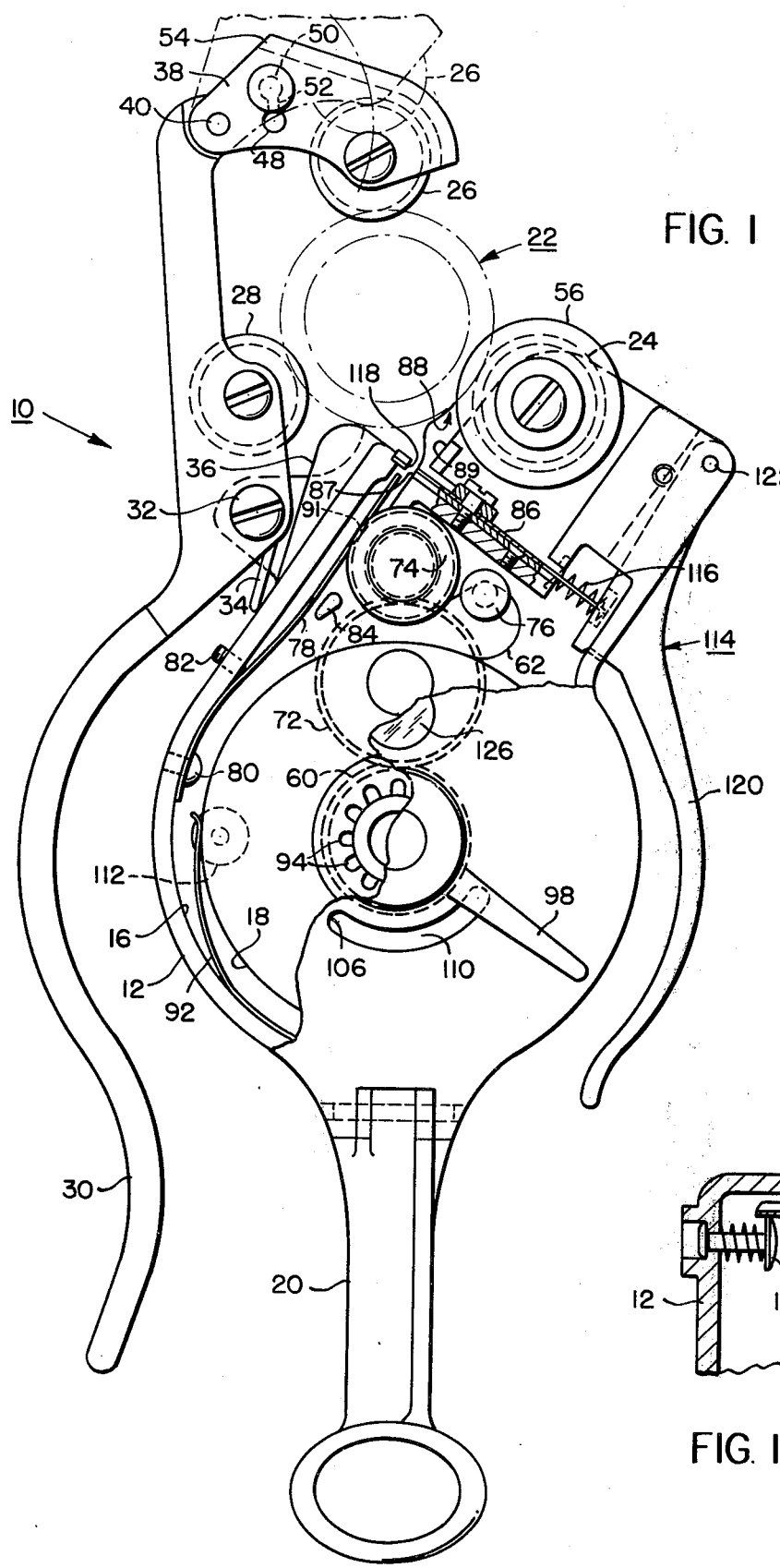
FIG. 1 is a side, partial cross-section view of the apparatus of the present invention.
FIG. 1A is a cross-section view through a portion of the apparatus of FIG. 1.
Figure 2:
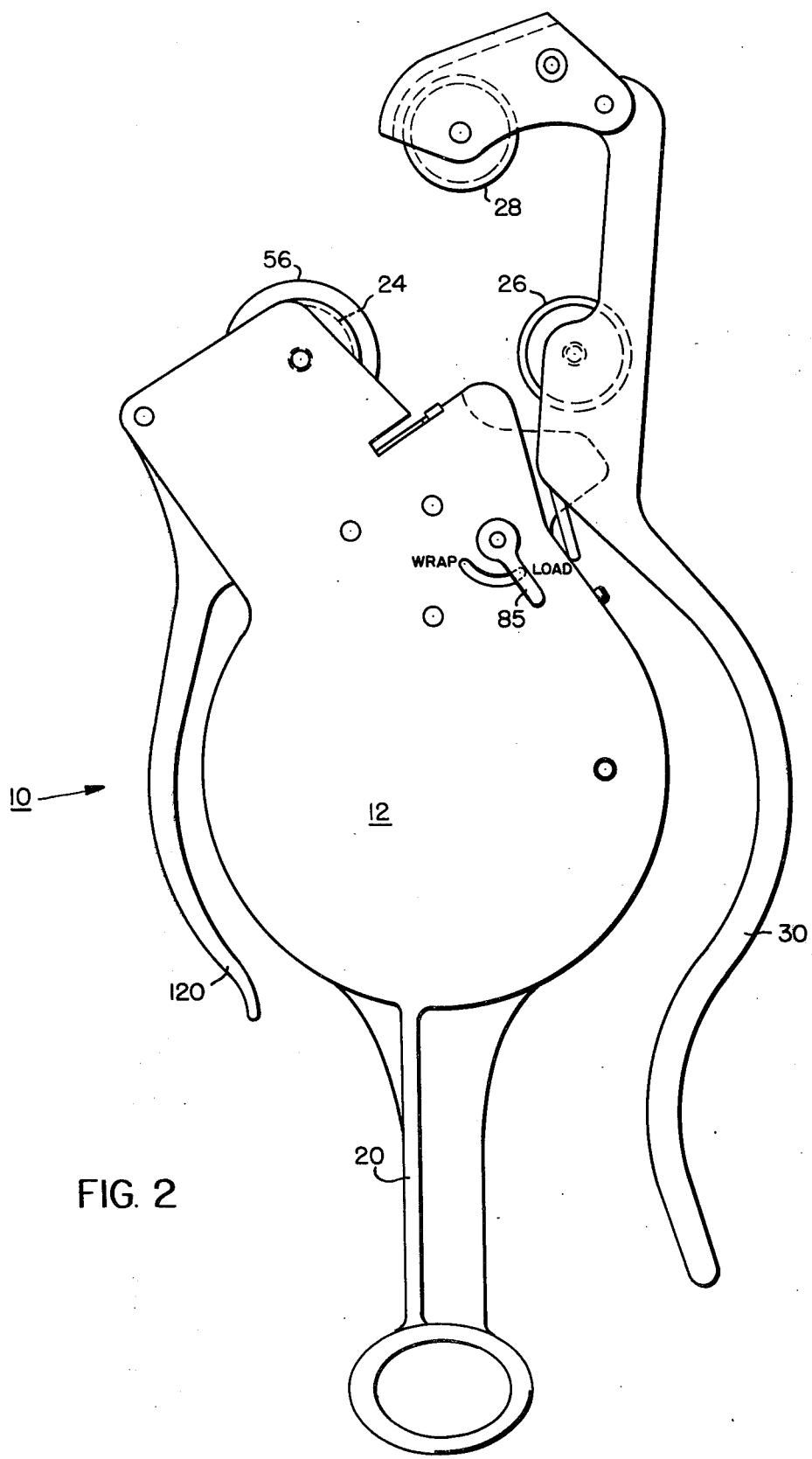
FIG. 2 is a side view of the other side of the tool of FIG. 1.

With reference now to the drawings, FIGS 1–5 show a prefered embodiment of the hand tool 10 of the present invention. The hand tool 10 includes a case 12 and a hinged cover 14 (see FIG. 4) for enclosing a tape roll chamber 16 in which a tape roll 18 is mounted for rotation. A handle 20 is connected to the case 12 for manipulating the tool 10.

The tool 10 is clamped onto the male threads of a fitting 22 between a splined (see splines 23, FIG. 3), threaded, spring-loaded, support, start roller 24 and a pair of threaded spring-loaded support rollers 26 and 28. The start roller 24 is rotatably mounted on the case 12, while the pair of rollers 26 and 28 are rotatably mounted on a clamping handle 30 pivotally connected to the case 12 at pivot 32. A clamping force spring 34 loads the pair of rollers 26 and 28, forcing them toward the start roller 24. A stop 36 on the case 12 limits clamping handle travel when no fitting is located between the rollers.

Figures 3, 4, 5:
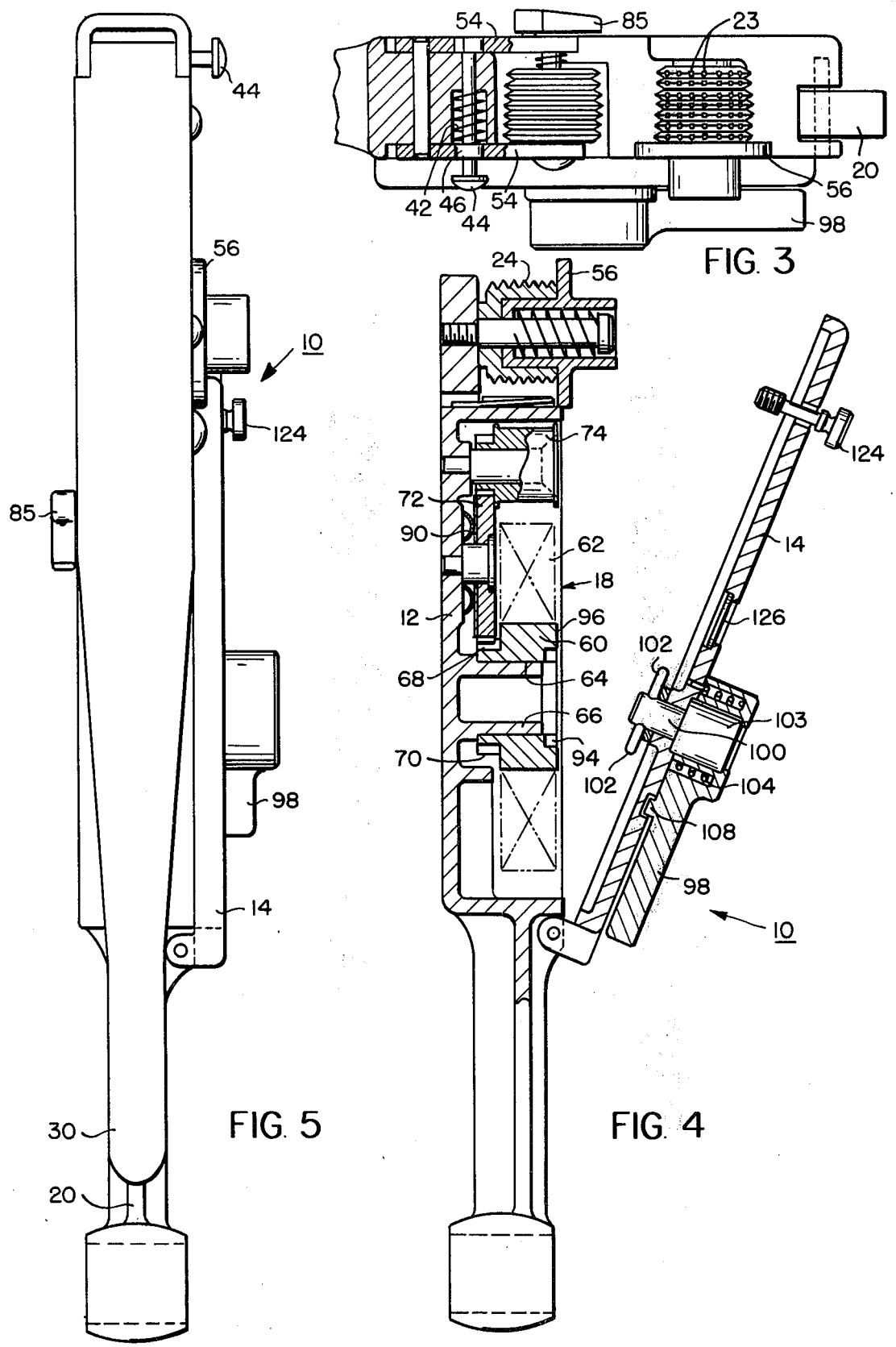
FIG. 3 is a top, partial cross-sectional view of the tool of FIG. 1.
FIG. 4 is an end, partial cross-sectional view of the tool of FIG. 1.
FIG. 5 is an elevational-end view of the tool as shown in FIG. 4 with the cover closed.

The roller 26 is mounted on a swivel support 33 pivotally connected to the clamping handle 30 at pivot 40. The swivel support 38 has tow positions; one is shown in solid lines and one is shown in dottled lines in FIG. 1. The mechanism that permits movement and locking of the swivel support 38 is shown in FIG. 3, and includes a spring 42 loading a button 44 toward a locking position with a collar 46 seated in one of the two larger openings 48 and 50, located at each end of a slot 52 in each of a pair of side plates 54 of the swivel support 38. To move the roller 26 to its other position, the button 44 is pushed in and the swivel support moved and the button released to lock it in the other position. In one location of the roller 26, the tool 10 can accommodate standard 1 inch, ¼ inches, and ½ inches pipe sizes, and in the other location of the roller, the tool can accommodate 2 inches pipe sizes, with no changing of parts.

As shown in FIG. 4, the start roller 24 is a splined, spring-loaded roller including a spring-loaded stop 56 to assist in aligning the end of the start roller 24 more or less flush with the end of the pipe thread to be wrapped.

The hand tool 10 also includes means for advancing tape from the tape roll 18 to the joint 88 in-between the fitting and the start roller 24. The tape roll 13 includes a core 60 on which a length of tape 62, preferably polytetrafluoroethylene tape, is wrapped. The core 60 has a cylindrical opening 64 therethrough for rotatably mounting the core on a cylindrical extension 66 of the case 12. The core 60 has a length greater than the width of the tape 62 and includes external gear teeth 68 on an external surface 70 thereof not covered by tape 62. The gear teeth 68 mesh with gear teeth on an intermediate gear 72, which in turn mesh with gear teeth on a splined metering feed roller 74. The intermediate gear and the metering feed roller 74 are both rotatably mounted on the case 12 as shown in FIGS. 1 and 4. A flanged guide post 76 is also mounted on the case 12 as shown in FIG. 1. A feed roll spring 78 is connected to the case 12 at 30 and is biased away from the feed roller 74, but is adjustably forced toward the feed roller 74 by an adjustment screw 82. An eccentric 84 is mounted on the case 12 adjacent the feed roll spring 78 for moving the spring away from the feed roller 74 to permit threading of the tape 62 inbetween the feed roller 74 and spring 73 up to a cutting blade 86. An actuating lever 85 is connected to the eccentric 84 for moving it between a "wrap" and "load" orientation.

As shown in FIG. 1, the tape 62 feeds from the roll 18, around the flanged guide post 76, to in-between an area of contact 91 between the feed roller 74 and feed roll spring 78, past a first land 87 that helps to guide the tape out of the case 12, past the cutter blade 86 and past a second land 89 that guides the tape into the joint 88 between the fitting and the start roller. As shwon in FIG. 1, the tape 62 is buckled and is therefore in a state of compression between the area of contact 91 and the joint 88. In this way, when rotation of the tool 10 around the fitting 22 begins (or the fitting is rotated within a stationary tool) the tape 62 will seek and find the spline roots of the splined start roller 24, thereby guaranteeing that the tape will start to wrap. Also, during the wrap start, there is ball tape (see FIG. 1) between the tape roll 18 and the feed roller 74. This ensures that there will be no tensile force on this portion of the tape 62 during the critical wrap start. As soon as the start is assured, this inventory is exhausted, and tape fouling is prevented by a brake 90 (see FIG. 4, brake 90 preferably comprises spring-loaded friction material bearing against the intermediate gear 72), plus the brake action of an anti-fouling spring 92 (see FIG. 1). The brake 90 and the anti-fouling spring 92 impose a sufficient tensile force on the entire tape train to prevent tape fouling and to induce the tracking needed to make sure that, upon cut-off, the tape will be in the proper position for making the next start. The "free" tape requirement is always satisfied even though the diameter of the tape roll 18 is changing continuously during tape roll depletion.

The means for advancing the tape through the above-described tape train will now be described. The core 60 also includes a plurality of radical grooves 94 in a front end surface 96 thereof. The cover 14 includes a spring-return, stop-limiting lever 98 connected by a shaft 100 extending through the cover 14 to a pair of pins 102 that are received in a pair of opposing ones of the grooves 94. The lever 98 is connected to the shaft through a one-way clutch 103; the clutch 103 allows the pins 102 and the tape roll 18 to remain in their new location as the lever 98 returns to its original or start position. A return spring 104 biases the lever 98 to its normal position shown in FIG. 1 and a stop 106 contacting flange 108 riding in a groove 110 defines the limit of travel of the lever 98. When the tool 10 is clamped onto a fitting 22, the lever 98 is moved as far as it will go by the operator, causing the tape to be advanced to the position shown in FIG. 1 to provide both a "buckling" mode and "free" tape.

After depletion and removal of a used tape roll, the anti-fouling spring 92 is manually pushed out of the way and held there by a spring-loaded button 112 (see FIG. 1A) that retains the spring 92 out of the way during insertion of a new roll; insertion of a new roll automatically releases the spring upon completion of insertion of a new tape roll 18. The cover 14 has a window 126 therein for viewing tape inventory.

The tape cutter 114 of the tool 10 includes a cutting blade 86 biased by a spring 116 out of the path travel of the tape 62. The blade 86 is moved toward an edge 118 to cut the tape 62 by a spring-loaded lever 120, pivotally connected to the case 12 at 122.

In operation, the cover 14 is opened and the button 112 is used to hold the spring 92 out of the way of the new tape 18 which is inserted into the chamber 16. The eccentric 84 is volated to move the spring 78 out of contact with the feed roller 74, and the distal end of the new tape 62 is threaded around the flanged guide post 76 and the metering feed roller 74 and up to at least the cutting blade 86. The lever 98 is then turned slightly if necessary so that the cover 14 can be closed (and locked by a thumb screw 124, see FIG. 4) with each pin 102 in a groove 94. The handles 20 and 30 are then closed, opening the jaws of the tool 10; the rollers 24, 26, and 28 are then placed on the fitting 22, and the handles 20 and 30 are then released clamping the tool onto the fitting. The metering lever 98 is then turned clockwise through its full travel (about 90°) thereby metering tape 62 to the joint 88, and simultaneously producing the tape buckling mode and the tape unwinding mode, both of which modes constitute "free" tape inventories both before and after the feed roller 74.

Then, by use of the case handle 20, the tool 10 is rotated for one or more complete turns as may be required. The cutter lever 120 is then depressed to cut the tape 62, and the tool is rotated a sufficient amount to use up the cut end of the tape and thus to complete the wrap. The tool 10 is then removed from the fitting 22 and is ready for the next wrap.

A most important aspect of this invention is the reliability in both starting and completing the wrap, achieved by the metering system. The manner in which an inventory of "free" tape, before and after the feed roller, is established has been discussed above. Further, upon relative motion of the pipe thread crests with respect to the tape surface, a shearing force is generated. Thus, when rotation of the tool 10 about the pipe fitting 22 is initiated: (a) the compressive and and shearing forces are brought to bear, (b) the tape seeks and finds the roots of the splines of start rollers 24 and, (c) the tape will start to wrap. During the wrap start, since there is "free" tape between the tape roll 18 and the feed roller 74, there is no tensile force on this portion of the tape 62 during the critical wrap start. As soon as the start is assured, the inventory is exhausted, and the brake 90 in the gearing plus the brake action of the anti-fouling spring 92 impose a sufficient tensile force on the entire tape train to prevent tape fouling and to induce the tracking needed to make sure that, upon cut-off, the tape 62 will be in the proper position for making the next start. The "free" tape requirement is always satisfied even though the diameter of the tape roll is changing continuously during the tape roll depletion.

It is noted that the net tensile force maintained on the tape 62 while wrapping, is quite constant even though the diameter of the tape roll is continuously decreasing with tape roll depletion. This is achieved through a two-part partition of correlative torques: the constant torque exerted via the spring-loaded intermediate gear 72 and the variable torque exerted by the anti-fouling spring 92. For the constant torque, the tape tensile force increases during wrapping as the tape roll is depleted and the moment arm decreases. For the variable-torque, anti-fouling spring 92, however, the force normal to the tape surface decreases during wrapping as the tape roll 18 is depleted and the moment arm decreases, In the tool 10, the constant torque and the anti-fouling spring rate are selected to yield a nearly-constant, net tensile force during the entire range of tape depletion.

Figure 6:
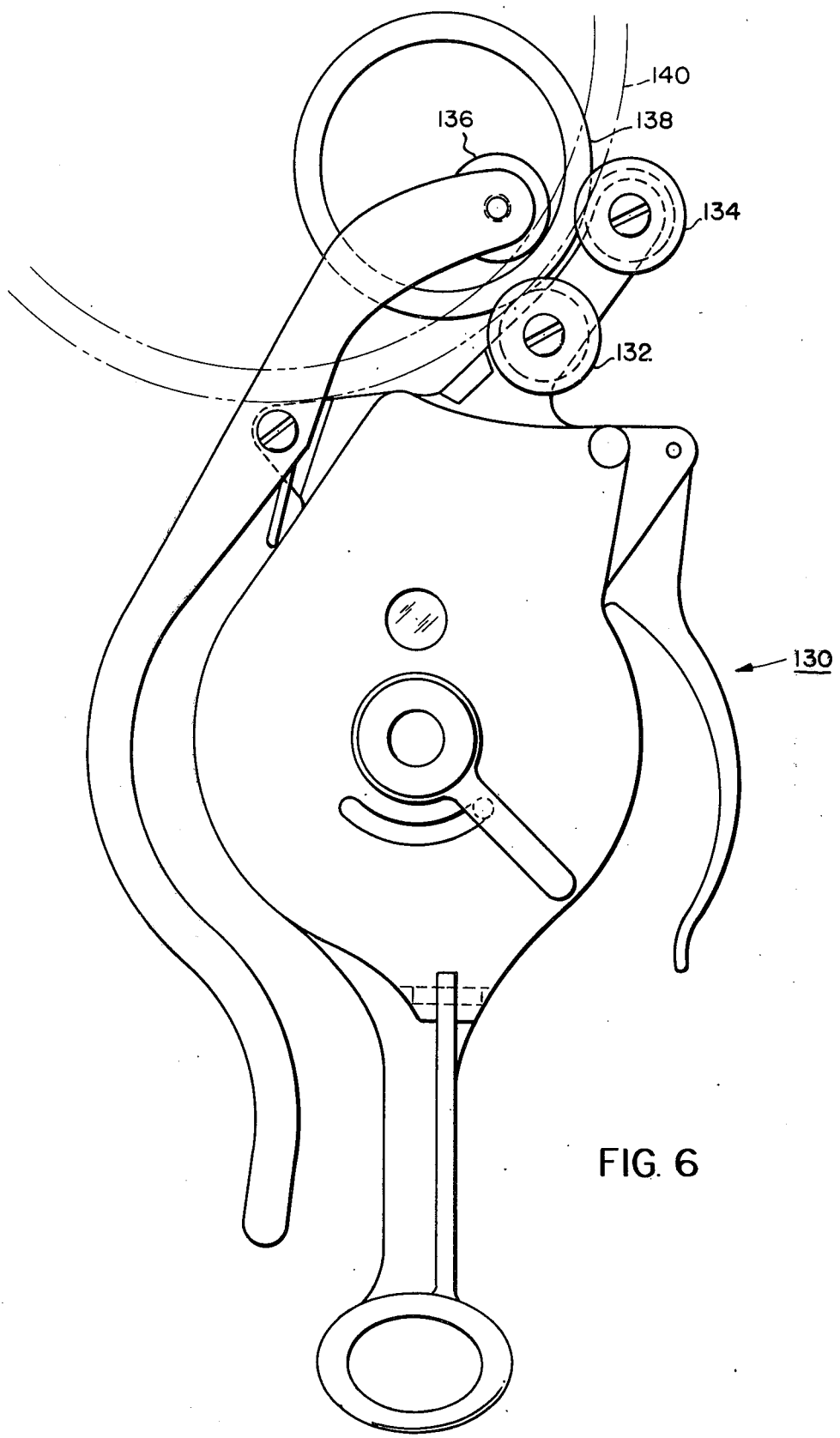
FIG. 6 is a side view of another embodiment of the hand tool of the present invention.

FIG. 6 shows another embodiment of the tool of the present invention. In this embodiment, an entire fitting 138 is not clamped in the jaws of the tool, but only a segment of the fitting is clamped. The tool 130 has a start roller 132, another roller 134, and an internal elastomeric roller 136. This arrangement requires fewer parts, requires less handle travel, can accommodate a wide range of large pipes (such as a pipe 140 shown in dotted lines), and obviates the need for large clamping arms and rollers.

Another embodiment (not shown) includes a model for attachment to powered pipe threaders. Each of these additional embodiments includes the metering and other basic components of the tool 10 of FIGS. 1–5.

The tape 62 is peferably a 1000-inch roll of 5 mil thick, 1.5 density, ½ inch wide tape. While the fitting 22 has been described above as a pipe with male threads, it is noted that this invention also applies to male threaded fittings other than pipe. Also, the invention includes the use of various tape compositions, thicknesses, widths, lengths, densities, and tensiles as may be indicated for the size and type of male threaded fittings under consideration.

The rollers 24, 26 and 28 are threaded to mate with the male threading of the fitting; the term "threaded" as used herein includes a thread with no lead. The three support rollers 24, 26, and 28 are slightly frusto-conical to better mate with the fitting in FIG. 4, the start roller 24 tapers from a larger O.D. on the right to a smaller O.D. on the left. The start roller 24 preferably has seven full threads with no lead and a plurality of saw-cut serrations equally spaced on the O.D. In the preferred embodiment, there are thirty serations, each about 1/32 inches wide and about 1/32 inches deep, and each extending longitudinally of the axis of the fitting. All four of the pipe sizes, 1, 1 ¼, 1 ½ and 2 inches have 11 ½ threads per inche; they are threaded for about 1 inch and as made up on the job employ about ½ inch of the threaded portion. Of the theoretical 11 ½ threads, only about nine are fully cut. The support rollers 24, 26 and 28 have fewer threads (in the preferred embodiment they have seven threads) so that by starting wrapping with the roller faces flush with the pipe faces, the tool in the preferred embodiment employs about two turns per wrap. The three support rollers 24, 26 and 28 are preferably made of polytetra fluoroethylene.

The invention has been described in detail with particular reference to the preferred embodiments thereof, but it will be understood that variations and modifications can be effected within the spirit and scope of the invention as described hereinabove and as defined in the appended claims.

I claim:

1. A tape roll including a core and a length of tape wound on said core, said core having a length greater than the width of the tape and drive means on the external surface of said core not covered by said tape and including a plurality of grooves in an end surface of said core.

2. The tape according to claim 1 wherein said grooves are radially extending and equally spaced apart.

3. The tape roll according to claim 2 wherein said drive means are adjacent a rear face of said core.

4. The tape roll according to claim 3 wherein said drive means are gear teeth.

5. The tape roll according to claim 4 wherein said core is a hollow cylinder and wherein said gear teeth are on the external cylindrical surface of said spool not covered by said tape.

6. The tape roll according to claim 5 wherein the outside diameter of said gear teeth is smaller than the outside diameter of the remaining cylindrical surface covered by said tape.

7. The tape roll according to claim 6 wherein said hollow cylindrical core has a smooth uniform inside diameter for rotatably mounting said tape roll.

8. The tape roll according to claim 7 wherein said tape is polytetrafluoroethylene.

9. A hollow cylindrical core having an external cylindrical surface adapted to have a length of tape wound thereon, said core having drive means on a portion of the external cylindrical surface thereof, and a plurality of grooves in an end surface of said core.

10. The core acccording to claim 9 wherein said grooves are radially extending and equally spaced apart.

11. The core according to claim 10 wherein said drive means are adjacent the other end surface of said core.

12. The core according to claim 11 wherein said drive means are gear teeth.

13. The core according to claim 12 wherein the outside diameter of said gear teeth is smaller than the outside diameter of the remaining external cylindrical surface of said core.

14. The core according to claim 13 wherein said hollow cylindrical core has a smooth uniform inside diameter for use in rotatably mounting said tape roll.

15. A tape roll comprising a hollow cylindrical core, a length of tape wound on a portion of an external surface of said core, said core having a length greater than the width of said tape, drive means on the external surface of said core not covered by said tape, and registration means on an end surface of said core.

16. The tape roll according to claim 15 wherein said registration means include a plurality of radially extending and equally spaced-apart elements.

17. The tape roll according to claim 16 wherein said drive means are gear teeth.

18. The tape roll according to claim 17 wherein said elements are grooves.

19. The tape roll according to claim 18 wherein the outside diameter of said gear teeth is smaller than the outside diameter of the remaining external cylindrical surface of said core and wherein said hollow cylindrical core has a smooth uniform inside diameter for use in rotatably mounting said tape roll.

20. The tape roll according to claim 19 wherein said tape is polytetrafluoroethylene.

21. The tape roll according to claim 20 wherein said core is a one-piece element and said gear teeth are integrally formed as a part of said core.

* * * * *

UNITED STATES PATENT AND TRADEMARK OFFICE
CERTIFICATE OF CORRECTION

PATENT NO. : 4,005,829
DATED : February 1, 1977
INVENTOR(S) : Walter R. Wise, Ellsworth J. Allen and Donald K. Fisher It is certified that error appears in the above-identified patent and that said Letters Patent are hereby corrected as shown below:

In Claim 2, line 1, after "tape" insert --roll--.

Signed and Sealed this

Nineteenth Day of April 1977

[SEAL]

Attest:

RUTH C. MASON
Attesting Officer

C. MARSHALL DANN
Commissioner of Patents and Trademarks